United States Patent [19]
Louk et al.

[11] Patent Number: 5,921,348
[45] Date of Patent: Jul. 13, 1999

[54] CONVERTIBLE TREESTAND FOR RIFLE/ BOW USE

[75] Inventors: John M. Louk; Alex Brewer; Ronnie J. Fuller, all of Leakesville, Miss.

[73] Assignee: L & L Enterprises, Inc., Leakesville, Miss.

[21] Appl. No.: 08/229,804

[22] Filed: Apr. 19, 1994

[51] Int. Cl.[6] .................................................. E04G 3/00
[52] U.S. Cl. ........................................ 182/187; 182/135
[58] Field of Search .................................. 182/187, 188, 182/133.3, 136

[56] References Cited

U.S. PATENT DOCUMENTS

| | | | |
|---|---|---|---|
| 4,417,645 | 11/1983 | Untz | 182/135 |
| 4,452,338 | 6/1984 | Untz . | |
| 4,726,447 | 2/1988 | Gibson et al. . | |
| 5,052,516 | 10/1991 | Jamieson | 182/135 |
| 5,234,076 | 8/1993 | Louk et al. . | |

OTHER PUBLICATIONS

Brent Hunt's Trophy Whitetail; Treestands.

*Primary Examiner*—Alvin Chin-Shue
*Attorney, Agent, or Firm*—Pillsbury Madison & Sutro LLP

[57] ABSTRACT

A treestand is provided which is constructed of two platforms. Both platforms have a supporting frame, one covered with an open grid member, for standing, while the other has a seat for comfortable seating. The seating platform may be mounted to a tree or the like in one of two positions. One position locates the front end thereof in a downward direction. This opens the front end for use in bow hunting. The other or second position is inverted, with the front end located in an upward direction so that it defines a rest surface for rifle hunting. Each platform is supported by a flexible cable that extends from one side of the outer end of the platform, through a side support around the tree to another pivital side support and is connected to the other side of the outer end. The cable itself is adjustable in length to accommodate different diameter trees.

19 Claims, 3 Drawing Sheets

CONVERTIBLE TREESTAND FOR RIFLE/BOW USE

FIELD OF THE INVENTION

This invention relates to treestands, and, more particularly, to a treestand which may be converted between bowstand and rifle stand use configurations.

BACKGROUND OF THE INVENTION

Treestands have been developed to position hunters or naturalists at elevated locations, such as in trees, from which undetected observation of wildlife may be accomplished. Typically, such devices are portable and include a seat platform for supporting the user's body. Occasionally, these devices also include a foot platform for supporting the user's feet and legs. During the hunting season, hunters alternate between the use of bows and rifles. Each of these hunting styles requires different requirements of location, position, aiming and movement. Accordingly, it is economical to employ a tree stand which is capable of converting from a bowstand, having an open front end to accommodate the bow and its use, to a stand having a rest surface and enhanced aiming or steadying capabilities.

Treestands have been developed which are capable of being converted between bowstand and rifle stand use configurations. However, these conventional treestands must be substantially disassembled to convert the stand from one use to another. Other treestands have a pivotal rear portion, disposed away from the tree, which can be pivoted from one position defining a rifle rest to a second position to accommodate bow hunting. However, since the rest surface is connected to the frame by a pivot, the surface may inadvertently move during use, thus, destroying the user's accuracy during firing.

SUMMARY OF THE INVENTION

The treestand for hunters according to the present invention is constructed of two platforms. Both platforms have a supporting frame, one covered with an open grid member, constructed of convenient material, for standing, while the other has a seat for comfortable seating. The seating platform may be mounted to a tree or the like in one of two positions. One position locates the front end thereof in a downward direction. This opens the front end for bow hunting uses. The other or second position is inverted with the front end located in an upward direction so that it defines a rest surface for rifle hunting purposes. Each platform is supported by a flexible cable that extends from one side of the outer end of the platform, through a side support around the tree to another side support and is connected to the other side of the outer end. The cable itself is adjustable in length to accommodate different diameter trees. A blunt, toothed blade extends from the frame and, in combination with the flexible cable and the side supports, holds the stand securely to the tree under a load.

Other objects, features and characteristics of the present invention, as well as the methods of operation and the functions of the related elements of the structure, and the combination of the parts and economics of manufacture, will become more apparent upon consideration of the following detailed description and appended claims with reference to the accompanying drawings, all of which form a part of this specification.

DETAILED DESCRIPTION OF THE PRESENTLY PREFERRED EXEMPLARY EMBODIMENTS

Figure 1:
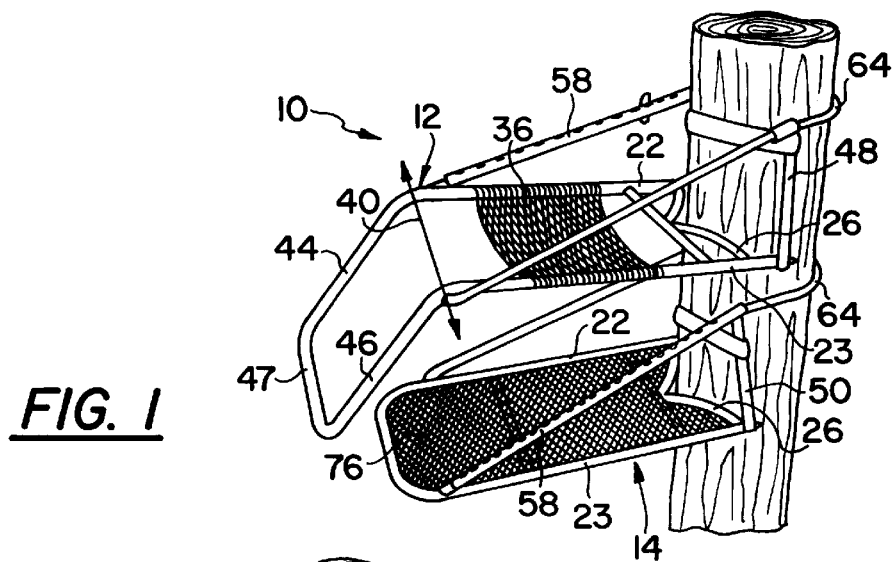
FIG. 1 is a perspective view of a seating platform positioned for bow hunting with a standing platform of the tree stand positioned therebelow.
Figure 2:
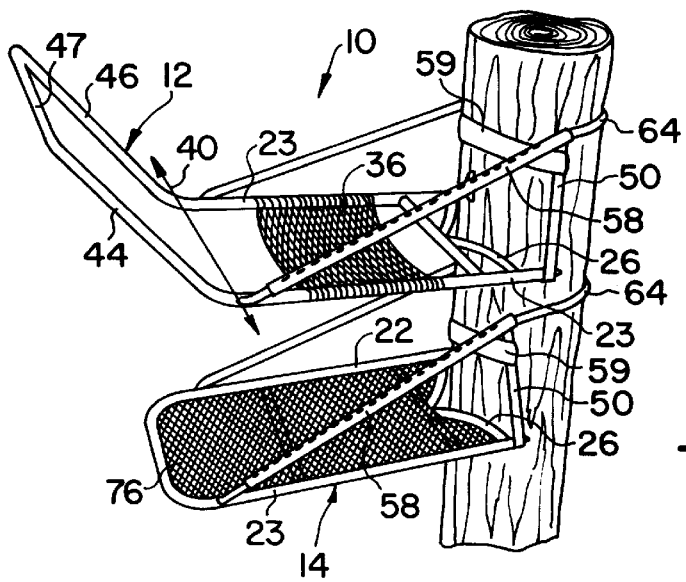
FIG. 2 is a perspective view of the seating platform positioned for hunting with the standing platform of the tree stand positioned therebelow.

Referring to FIGS. 1 and 2, the treestand 10 includes two platforms, referred to herein as a seating platform 12 and a standing platform 14, respectively.

Figure 5:
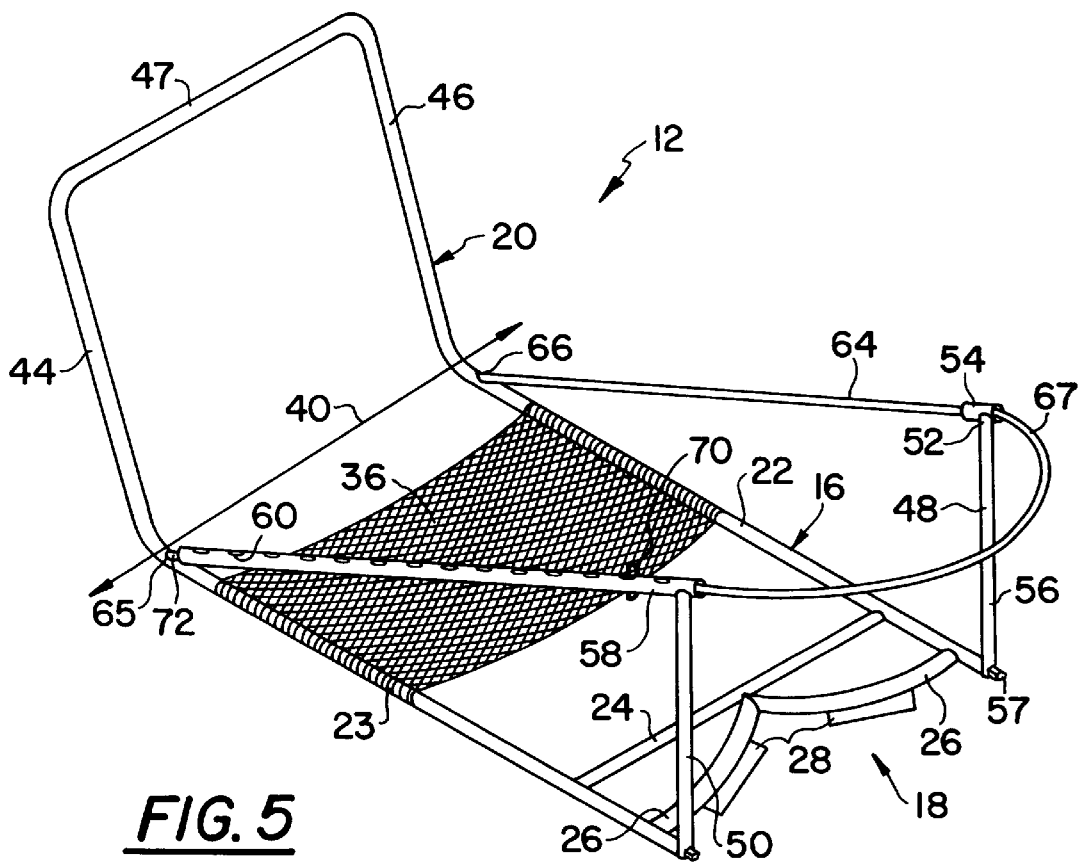
FIG. 5 is a view of the seating platform of the invention.

FIG. 1 shows the seating platform 12 disposed above the standing platform 14 in a bow hunting configuration. As shown in greater detail in FIG. 5, the seating platform 12 includes an outer peripheral frame 16 having a front end portion 18, a rear end portion 20, and sides 22 and 23 disposed opposite one another connecting the front and rear end portions. The frame 16 is preferably made of ¾ " or 1' conduit, which combines the required qualities of rigidity, lightness and strength. It can be appreciated, however, that any suitable tubing, extrusion or molding may be used and that various materials, including metals, such as aluminum or steel, or other materials such as plastic or polycarbonates could be used. Also, the major frame members could be molded together as an integral unit or otherwise welded or suitably connected together. A cross support 24 braces the front open end portion 18 of the main frame 16. The cross support 24 is also conduit or tubing and is preferably fastened to the sides 22 and 23 of the frame by welding. As shown in FIG. 5, while the cross support 24 is spaced from the open end of the main frame 16, other cross supports could be used, as well as additional bracing between the sides 22 and 23 and such cross rails.

Two tree base support members or tubes 26 extend from a point at the center of the cross support 24 to points near open ends of the frame 16. While tubes or members 26 are shown with an arcuate shape, other shapes could be used. Since the tree support tubes 26 bear the weight of the platform 12 and the user, they are preferably constructed of heavier material than the frame 16 and are typically 1' diameter conduit. It can be appreciated, that other types of support members or tubes may be used of appropriate strength or that other bracing could be used between members 26 and cross rail 24 or with respect to sides 22 and 23, respectively. The support tubes 26 are preferably fastened to the sides 22 and 23 of the frame 16 by welding or the like.

Figure 7:
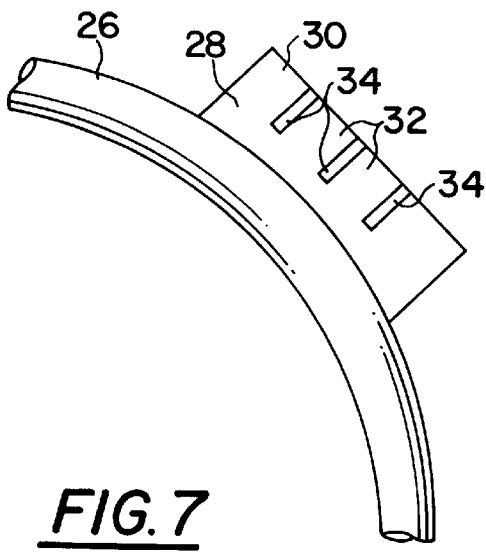
FIG. 7 is a view of the blades of the stand.

Welded support blades 28 extend for a distance near the middle of each support tube 26 and are generally tangent to the curvature of the base support tube. As shown in FIG. 7, blades 28 are formed of a thick rectangular plate having a blunt rounded outer edge 30 which is interrupted to form blunt segments or teeth. In the illustrated embodiment, the blades are approximately 4' wide and about ⅛ of an inch thick. The individual segments 32 are about 1" wide and four segments are separated by spaces 34. The blades 28 and segments are placed such that the base support 26 has an aspect of a nearly a right or obtuse angle. As a result, the base support 26 and blades 28 accommodate a wide variation in tree trunk diameters, with each blade 28 being tangent to the tree trunk so as to provide optimum support.

A flexible net or fabric seat 36 extends between the two sides 22 and 23 of the frame 16. The seat 36 is preferably free sliding so it may be moved along the frame 16 to a position desired by the user. For example, in the position shown in FIG. 1 it is available for seating but when pushed toward cross support 24, the user could stand on platform 14 and be upright through platform 12 and inbetween sides 22 and 23.

As shown in FIG. 5, the rear end portion 20 of the seating platform frame 16 defines a substantially U-shaped portion which is affixed to the opposing sides 22 and 23 of the frame 16. The U-shaped rear end portion 20 includes two side members 44 and 46 and a cross member 47 joining the two side members 44 and 46. As shown in FIG. 5, the U-shaped portion 20 is made integral with the frame sides 22 and 23, the function of which will become apparent below.

The sides 22 and 23 of the frame define a reference plane 40 and the rear end portion 20 is disposed at an angle in the range of 30 to 60 degrees with respect to a plane transverse to the reference plane 40, such that the rear end portion 20 is disposed in a plane different from that of the reference plane 40. In the illustrated embodiment of FIG. 5, the rear end portion 20 is shown disposed above the reference plane 40.

Figure 6:
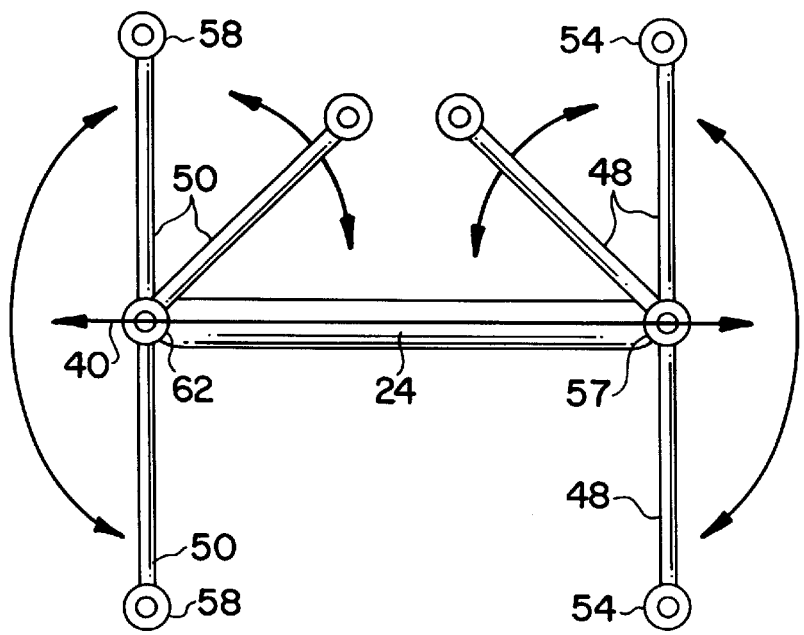
FIG. 6 is an end view of the seating platform of the invention showing the folding sides folding toward each other for storage and away from each other to invert the stand.

Folding side supports 48 and 50 are pivotally connected to the front ends of sides 22 and 23 of frame 16. A first side support 48 is a length of conduit terminating at one end 52 in a T-shaped cross tubing section 54. The other end 56 of the side support 48 is pivotally attached to side 22 of the frame 16 at pivot 57. With reference to FIG. 6, in the operating position, the side support 48 is disposed perpendicular to side 22 of the frame and above the reference plane 40, but can fold from the upright position to a inward position flat against the frame 16. Further, the side support 48 may be pivoted outwardly with respect to side 22 of the frame 16 so as to be disposed at a position 180° from its upright position and thus, below the reference plane 40.

The second side support 50 is similar to the first side support 48 except that the T-shape cross tubing 58 extends for a distance along the length of side 23 of the frame 16 to a point adjacent the frame, so as to form a triangular shape with side 23 of the frame 16. The T-shaped cross tubing 58 is provided with periodic through-holes 60 therein, the function of which will be appreciated below. As shown in FIG. 6, the second side support 50 may pivot in the same manner as the first side support 48. Thus, the second side support 50 is pivotal at pivot 62, inwardly to lie against the frame 16, or outwardly, through reference plane 40, and through at least an angle of 180° about side 23 of frame 16.

Figure 8:
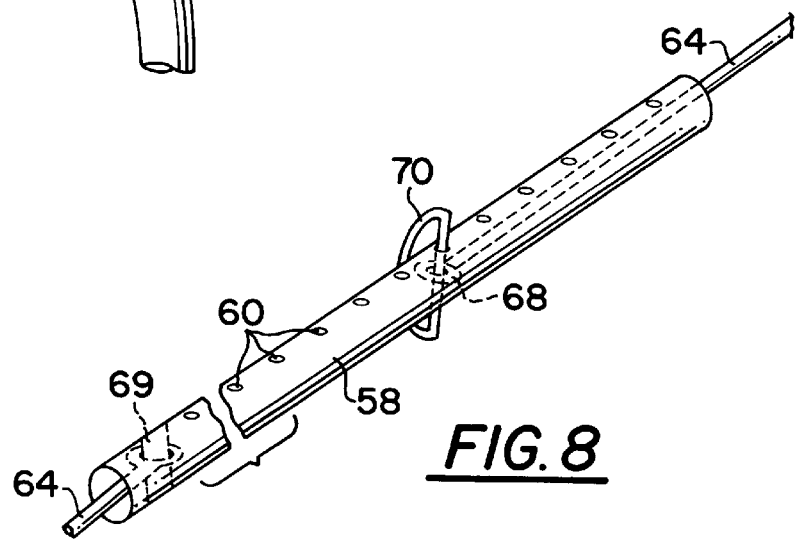
FIG. 8 is a detail view of the cable attachment to the folding sides of a platform.

A support cable 64, preferably flexible and comprised of a steel cable and covered with a flexible rubber outer tubing, will extend through the tubing forming rear end 20 and emerge through an opening at a position indicated at 66. The first end would be connected to a pin 69, as shown in FIG. 8, and would run from support 58 into frame 16 at a point 65 indicated in FIG. 5. Alternately, the cable could be fixed to frame 16 at point 66 near the juncture of the side 22 and the rear end portion 20. In either instance, the cable 64 thereafter extends from the point 66 through the first side support T-shaped cross tube 54, is formed into a loop 67 and passes into side support 58, terminating at a second free end 68, shown in FIG. 8, within side support 58 in which it is fixed by a fastening ring 70.

If the cable were fixed to frame 16 at 66, a second, flexible, short cable 72 would be required to extend from pin 69 to the frame at point 65.

Free end 68 of cable 64 is slidable within cross tube 58. Thus, the length of cable 64 required to form a tree trunk enclosing loop may be adjusted by fastening the free end 68 within side the cross tube 58 by using PTO fastening ring 70 or another convenient removable fastener that can be inserted through one of the periodic holes 60 provided in the cross tube 58. A strap 59 (FIG. 2) may be coupled between side supports 48 and 50 to ensure against slipping and to provide additional support if desired.

Figure 4:
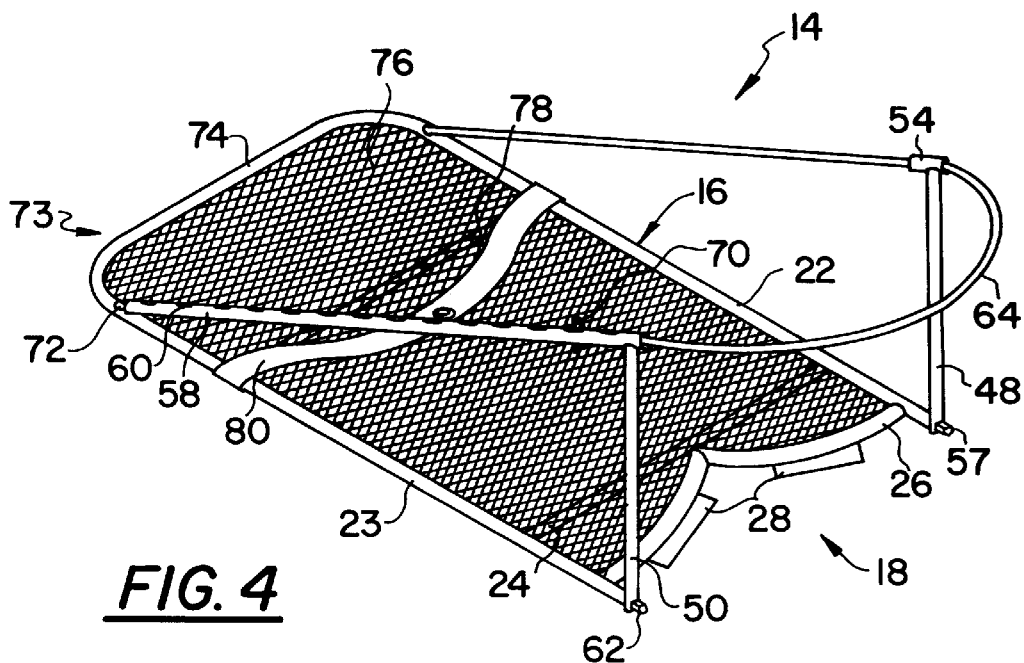
FIG. 4 is a view of the standing platform of the invention.

The standing platform 14 is constructed in a manner similar to that of the seating platform 12, and like parts are given like reference numerals. However, as shown in FIG. 4, the frame for platform 14 lies in one plane. The rear end portion 73 includes cross member 74 connecting sides 23 and 22 so that the rear end portion 73 is disposed in the same plane as a reference plane defined by side members 22 and 23. Further, instead of the flexible net seat of the seating platform 12, a rigid supporting floor base 76 is provided, preferably constructed of expanded metal, for example 13 gauge, fastened to the frame 16 by welding. It can be appreciated that other materials, such as plastic, could be employed for the supporting floor base 76. The standing platform 14 is disclosed in my U.S. Pat. No. 5,234,076, the disclosure of which is incorporated hereinto by this reference. As shown in FIG. 4, additional floor cross supports 78 may be provided to stiffen the floor base 76 to support the weight of the standing user.

An adjustable foot strap 80 is provided across the frame 16 and is disposed above the floor base 76. The foot strap 80 may be of cloth belting, fastened to the frame at each side 22 and 23, into the floor base 76 at the center of the foot strap so as to form two loops adapted to receive the users feet.

The use of the tree platforms will be described below, with reference to FIGS. 1–3. First, both platforms 12 and 14 are unfolded. The standing platform 14 is then attached around a chosen tree by running the cable free end 68 around the trunk and fastening it within the cross tube 58 with the PTO ring 70 so that the tree trunk is encircled. The platform 14 may be adjusted and raised a distance up the tree trunk. The weight of the platform 14 is supported by the support cable 64 and blunt blades 28 which grip the tree. The blades 28 are configured so as to grip the bark of the tree but do not penetrate and thus damage the inner bark. Since the cable 64 is flexible and the side supports 48 and 50 are pivotal, when the platform 14 is disposed about the tree, the side supports 48 and 50 tilt inwardly to contact or hug the tree and thus provide secure hold on the tree.

Once the standing platform 14 is fastened around the tree, the user, while standing to the side and on the ground, in a similar manner, fastens the seating platform 12 to the tree. The seating platform is arranged such that the support members 48 and 50, and the rear end portion 20 are disposed above the reference plane 40. In this position, the rear end portion 20 is disposed to define a rifle rest member 48 substantially at eye level, as shown in FIG. 2. The user simply sits on seat 36, placing his feet between sides 22 and 23 so they rest on platform 14.

To convert the tree stand for bow use, the user simply removes the flexible cable 64 from its grasp around the tree and rotates the side supports 48 and 50, 180° about the sides 22 and 23 of frame 16 (FIG. 6). Next, the entire seating platform 12 is inverted from its previous orientation and the cable free end 68 is disposed around the trunk and fastened within the cross tube 58 as explained above. Thus, upon rotating the sides 22 and 23 through the reference plane 40 and flipping the platform 12 over, the rear end portion 20 is disposed below the reference plane 40 while side supports 48 and 40 are disposed above the reference plane 40 (FIG. 1). Thus, for bow hunting, the rear end portion 20 defines a member 43 for resting the users feet thereon, when the users back is disposed aagainst the tree. Upon aiming and utilizing the bow, the user may lean forward, disposing his feet between the U-shaped rear end portion 20 so as to be supported firmly on surface 76 of the standing platform 14, while bow movement is not impeded by the seating platform 12. This is so since the rear end 20 is angled downwardly away from the user and exposes an open, unobstructed view and a wide angle of site lines.

It can be appreciated, that, when the rear end portion 20 is employed as a rifle rest, the rest member 48 must not exhibit significant movement when leaned against or when the rifle is placed thereon for aiming. Thus, in the illustrated embodiment, the rear end portion 20 is made integral with sides 22 and 23 of the frame 16 so as to provide a secure support. It can be appreciated that members 44 and 46 could also be used for rifle support and aiming purposes.

Once the seating platform 12 is fastened to the tree above the standing platform 14, the user may easily adjust platform height by sitting in the seat, and, placing his feet in the foot strap, may easily raise the seating platform 12, or by standing on the standing platform 14, raise the seating platform 12.

Figure 3:
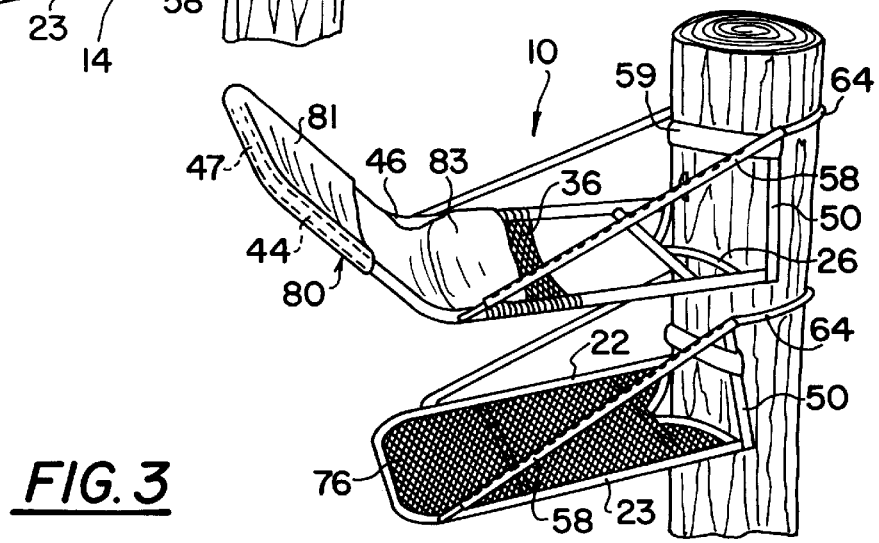
FIG. 3 is a perspective view of the seating platform in position as a backrest with the standing platform therebelow.

With reference to FIG. 3, the seating platform may further include a padded cushion back rest 80 disposed over cross member 47 and between the side members 44 and 46 and of the rear end portion 20. The padded cushion 80 may be coupled further to the seating platform 12 by the use of conventional hook and loop fastening (not shown). Padded cushion 80 preferably includes a back pad 81 and a seat pad 83 which may be disposed over the flexible net 36 to provide a cushioned seat. Alternatively, a flexible netting can be employed as the back rest. Thus, the user may sit on seat pad 83, facing the tree, with his back supported by the back pad 81. The padded cushion 80 may be removed when or moved out of the way when desired. If a netting is employed, the netting can be removed or slid along the side members 44 and 46 so that the net may be moved out of the way when desired. The padded cushion 80 can also be attached to the tree to provide a cushioned back rest and seat when the user is facing away from the tree.

It has thus been seen, that the invention provides an effective and versatile hunting platform which may be easily converted from bow use to rifle use configurations without substantially dismantling the platform. The integral U-shaped rear end portion defines foot rest in one position and a rigid rifle rest or backrest in a second, inverted position.

While the invention has been described in connection with what is presently considered to be the most practical and preferred embodiment, it is understood that the invention is not limited to the disclosed embodiment but, on the contrary, is intended to cover various modifications and equivalent arrangements included within the spirit and scope of the appended claims.

What is claimed is:

1. A convertible tree stand platform for rifle and bow-hunting comprising:

a main frame having a front end portion for engaging a tree, a rear end portion, and sides disposed opposite one another connecting said front and rear end portions, said sides defining a reference plane, said rear end portion being disposed at an angle with respect to said sides so as to extend in a plane different from said reference plane, first and second members each having a first end pivotally coupled to the main frame on said opposite sides adjacent the front end portion thereof, and a second end spaced from said first end, said first and second members being pivotal so as to be moved through said reference plane; and a flexible connector secured to said main frame and engaging said second ends of each said first and second members for holding the platform to the trees wherein said platform is constructed and arranged to be mounted to the tree for use a in bow-hunting position, wherein said rear end portion is disposed below said reference plane and said first and second members are disposed above said reference plane, and after moving said first and second members through said reference plane for use in a rifle-hunting position, wherein said rear end portion and said first and second members are disposed above said reference plane.

2. The tree stand as in claim 1, further comprising a seat member coupled to the sides of said main frame and disposed therebetween.

3. The tree stand as in claim 1, wherein said flexible connector is secured to the rear end portion.

4. The tree stand as in claim 1, wherein each said first and second member is movable through at least an angle of 180° about respective sides of the frame.

5. The tree stand as in claim 1, wherein said rear end portion is integral with said sides.

6. The tree stand as in claim 1, wherein said rear end portion includes side members integrally coupled with said sides of said main frame and a cross member joining said side members.

7. The tree stand as in claim 6, further comprising a back support disposed between said side members of said rear end portion.

8. The tree stand as in claim 1, wherein the flexible connector is adjustable in length relative to said main frame.

9. The tree stand as in claim 1, wherein the flexible connector extends through at least a portion of the main frame.

10. The tree stand as in claim 1, wherein said first and second members interact with said flexible connector so that first and second members move in contact with a tree on which the tree stand is mounted.

11. The tree stand as in claim 1, wherein said first and second members interact with said flexible connector so as to permit said first and second members to move through said reference plane.

12. The tree stand as in claim 10, wherein the second ends of said first and second members are comprised of support structure slidably retaining said flexible connector so that said flexible connector can move in at least one direction relative to said upper end yet be restrained in at least two other directions.

13. The tree stand as in claim 12, wherein said second end support structure comprises a tubular member.

14. The tree stand as in claim 1, wherein said main frame and said first and second members are comprised of tubing.

15. The tree stand as in claim 14, wherein some tubing is metal.

16. The tree stand as in claim 1, wherein said front portion includes a tree support structure connected to and extending across said main frame so that said support structure will abut said tree when the tree stand is in place and said first and second members are positioned forward of said front portion.

17. The tree stand as in claim 16, wherein a tree support structure includes a cross member fixed to and extending across said main frame and a pair of arcuate members extending outwardly from the mid point of said cross member and intersecting the main frame at a point forward of said cross member.

18. The tree stand as in claim 17, further including a tree gripping member fixed to said pair of arcuate members.

19. The tree stand as in claim 12, wherein said flexible connector is adjustably mounted to one of said second ends.

* * * * *